United States Patent [19]

Swatty

[11] 3,737,254
[45] June 5, 1973

[54] REGENERATIVE RAPID STROKE RECIPROCATING HYDRAULIC PRESSURE CONVERTER

[75] Inventor: Eugene E. Swatty, Euclid, Ohio
[73] Assignee: Fluid Controls, Inc., Mentor, Ohio
[22] Filed: Feb. 22, 1972
[21] Appl. No.: 227,780

[52] U.S. Cl..................................417/403, 91/346
[51] Int. Cl.......F04b 17/00, F04b 35/00, F01l 31/02
[58] Field of Search.....................417/391, 401, 402, 417/403; 91/346, 347

[56] References Cited
UNITED STATES PATENTS
3,589,839   6/1971   Johnson ...............................417/391

Primary Examiner—Carlton R. Croyle
Assistant Examiner—Richard E. Gluck
Attorney—John Harrow Leonard

[57] ABSTRACT

A hydraulic converter in which a differential piston is reciprocable in a cylinder by pressure fluid admitted continuously thereinto through a cylinder inlet at one side of the piston. Valve and duct means, including a valve sleeve, connect the cylinder at the other side of the piston alternately to said inlet side and to a sump, depending upon the reciprocated position of the piston and of the sleeve. Specialized snap acting overcenter springs floatingly support the valving sleeve for substantially frictionless reciprocation in opposite directions past a center position to final valving positions, respectively, and are operable to drive the sleeve with a snap action, in the direction toward the final valving position to which the sleeve was being driven by the piston as the sleeve passed over center position. A lost motion connection between the piston and the sleeve drives the sleeve to and slightly beyond the center position of the sleeve in opposite directions upon movement of the piston in opposite directions past determined positions, respectively.

11 Claims, 9 Drawing Figures

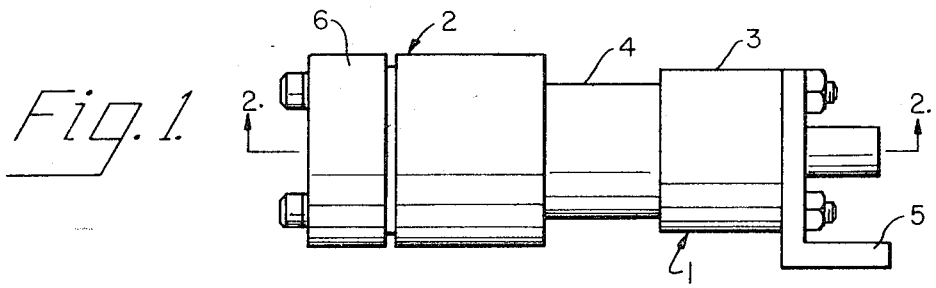
Fig. 1.
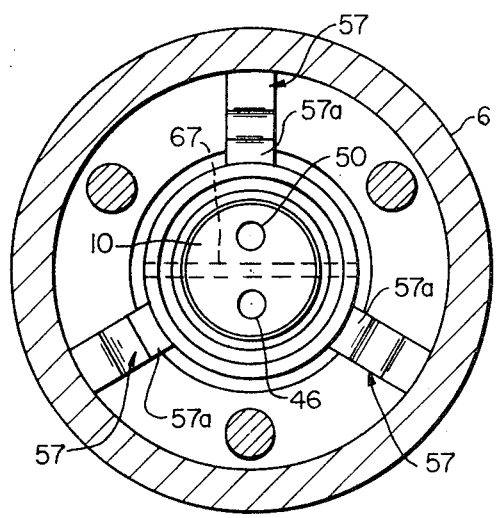
Fig. 4.
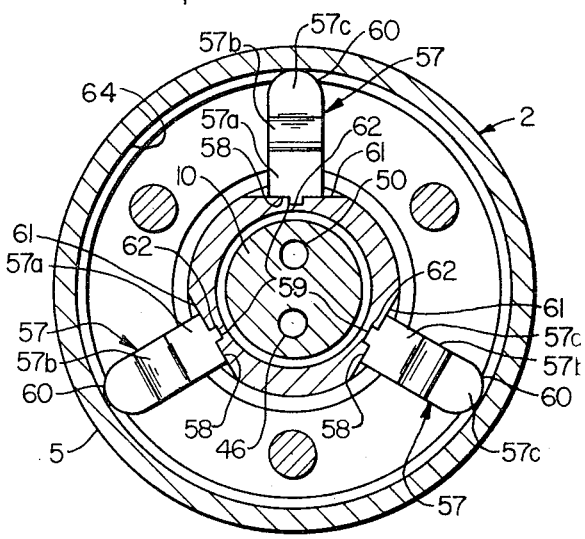
Fig. 5.
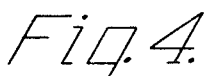
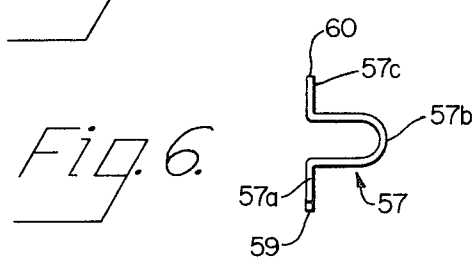
Fig. 6.
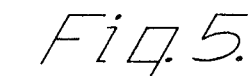
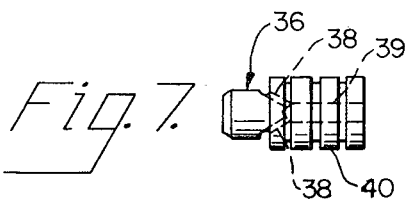
Fig. 7.
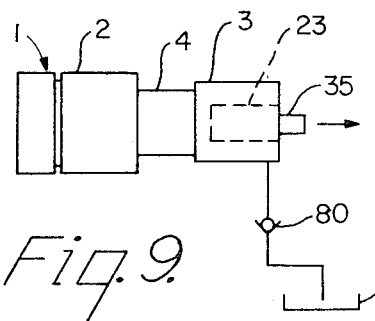
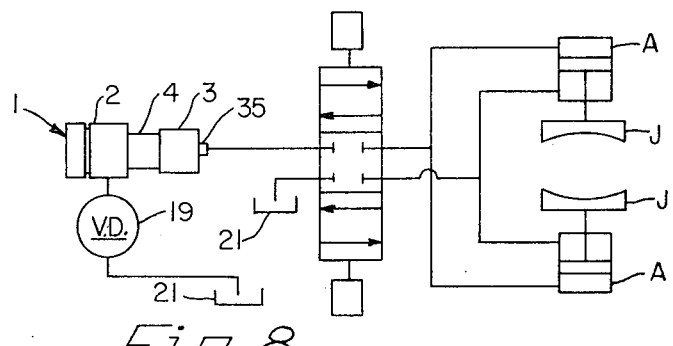
Fig. 8.
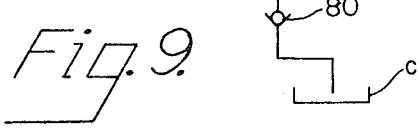
Fig. 9.

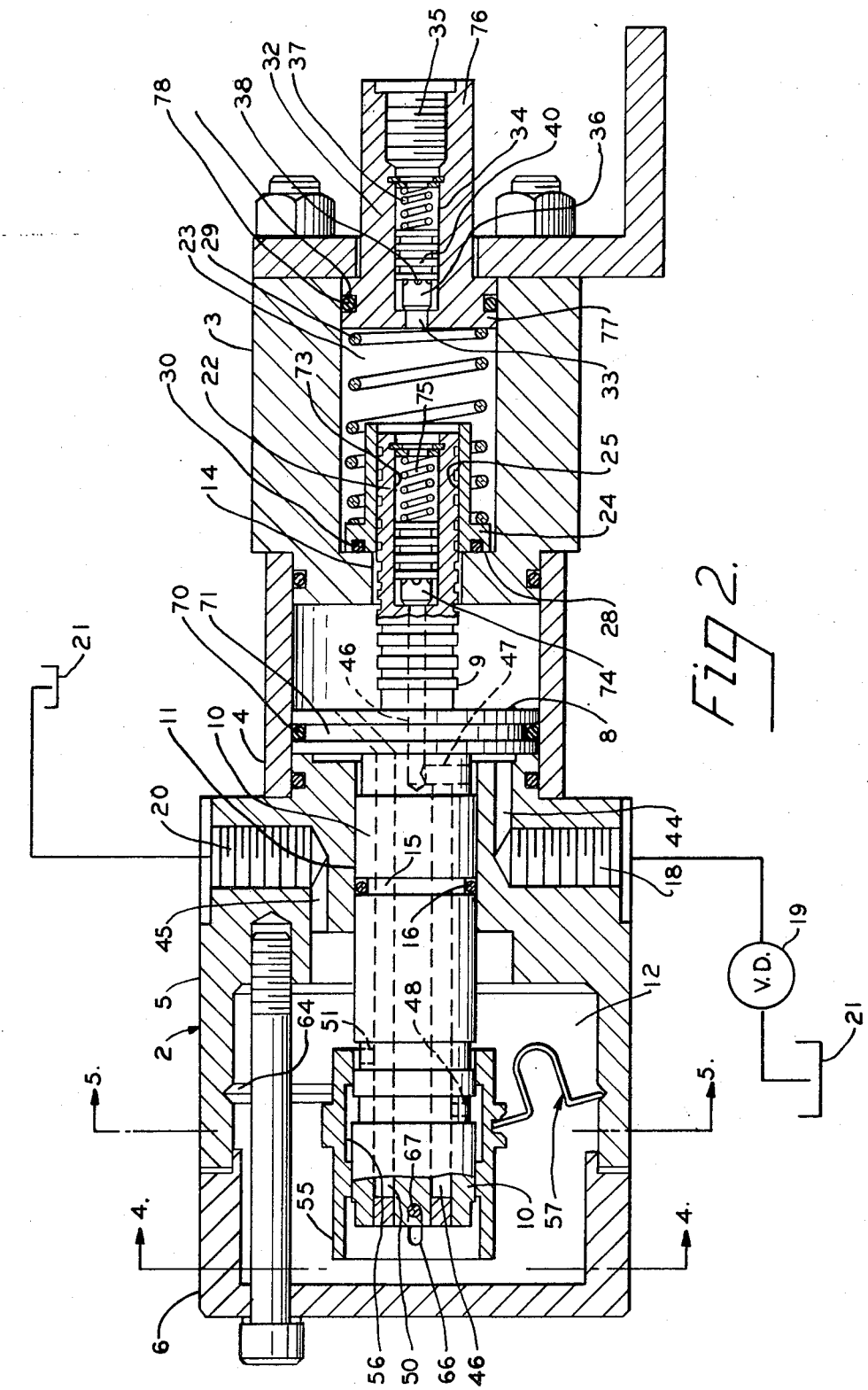

REGENERATIVE RAPID STROKE RECIPROCATING HYDRAULIC PRESSURE CONVERTER

BACKGROUND OF INVENTION

1. Field of Invention

Differential pressure hydraulic power converter.

2. Description of Prior Art

The prior art discloses hydraulic pressure converters employing differential pistons which, on the power stroke, operate a pump which delivers pressure fluid at a higher pressure than the line pressure supplied from a pressurized source. In these prior structures, valve means connect the power cylinder at both sides continuously to the source and alternatively connect the cylinder at opposite sides of the piston to each other. Such structures are exemplified in U.S. Pat. No. 2,749,886, of June 12, 1956, entitled "Fluid Pressure Self-Reciprocating Actuator." In this structure, the piston is driven on its power stroke by the differential in total pressure on its opposite sides and is driven on its return stroke by full line pressure applied to one side while the other side is vented to exhaust. Such structures have been used for pumping of fluids at pressure higher than line pressure and for operating other devices, such as a percussive tool as exemplified in U.S. Pat. No. 936,550 of Oct. 12, 1909.

These prior structures do not use the potential of the line pressure to the best advantage, do not operate to effect as rapid a return as desirable of the differential piston after completion of its power stroke, and do not provide a regenerative circuit for the transfer of the pressure fluid from the power side of the differential piston to the opposite side of the piston during the return stroke. Again, the valves used in the prior structures respond too slowly and are subject to binding.

SUMMARY OF INVENTION

The converter operates under full line pressure on its power stroke by fluid applied to its cylinder at one side of the differential piston while the cylinder at the opposite side of the piston is vented to atmosphere. The system is regenerative on the return stroke, and the shift from advance to return of the piston is substantially instantaneous due to a specialized control valve.

Various specific objects and advantages will become apparent from the following description wherein reference is made to the drawing.

BRIEF DESCRIPTION OF DRAWING

FIG. 1 is a side elevation of a regenerative rapid stroke reciprocating hydraulic pressure converter embodying the principles of the present invention;

FIG. 2 is an enlarged longitudinal sectional view of the converter taken on line 2—2 in FIG. 1 and showing the relative position of the operating parts at the initiation of the power stroke;

FIG. 4 is a cross sectional view taken on the line 4—4 in FIG. 2;

FIG. 5 is a cross sectional view taken on the line 5—5 in FIG. 2;

FIG. 6 is a side elevation of one of the over-center springs used in the invention;

FIG. 7 is an enlarged side elevation of the check valves used in the converter;

FIG. 8 is a diagrammatic illustration of the converter as applied to a plurality of clamping jaws; and FIG. 9 is a diagrammatic illustration of a modified pumping circuit that may be used in the present invention.

Figure 3:
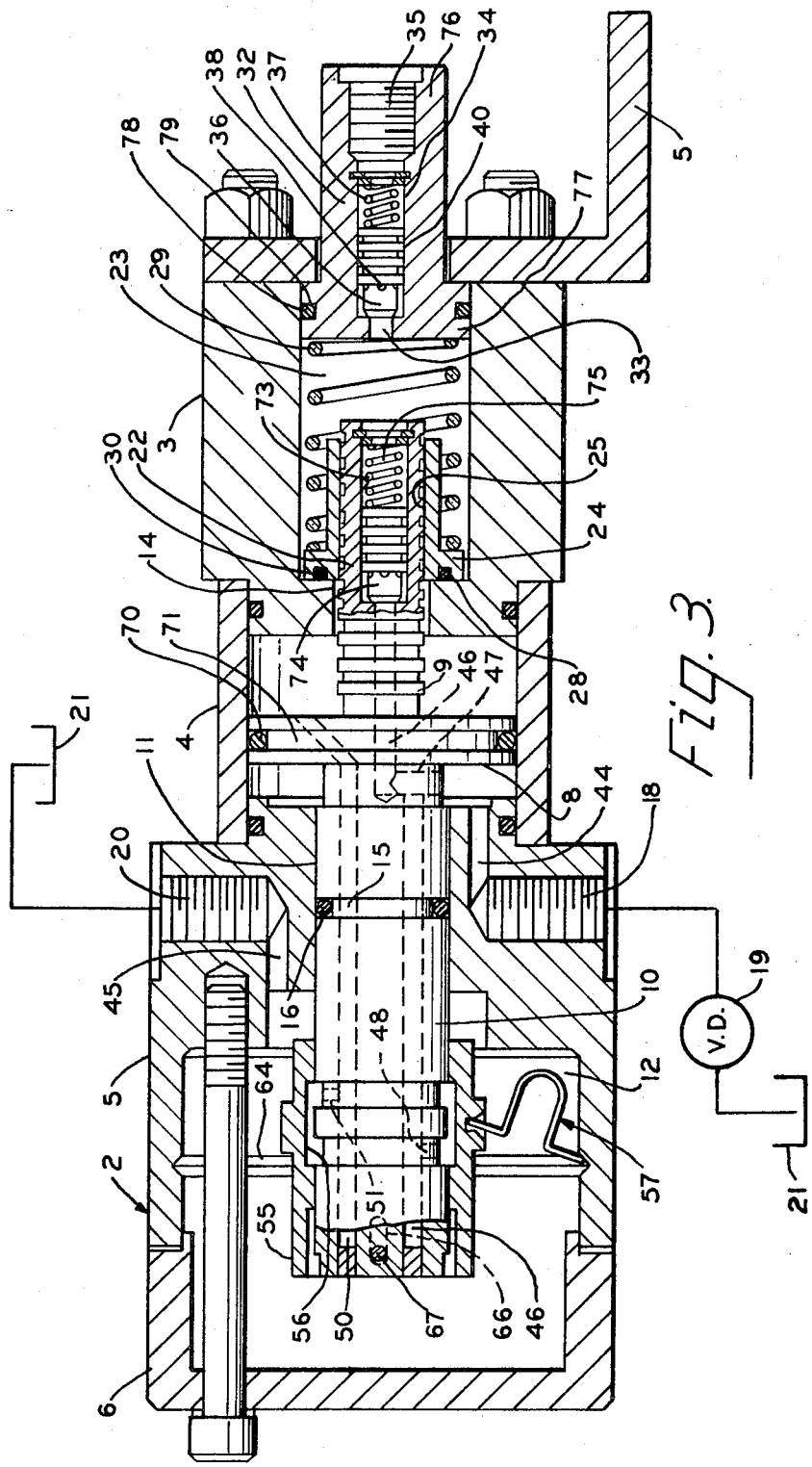
FIG. 3 is a longitudinal sectional view similar to FIG. 2 showing the relative position of the parts at the completion of the power stroke.

Referring to the drawing, the converter comprising a body 1 composed of a valving housing 2, a pump housing 3, and a power cylinder 4 therebetween and communicating therewith. The valve housing 2 may be formed of a main body portion 5 closed at its outer end by a cover 6 in sealed relation thereto. Mounted within the cylinder 4 for reciprocation axially thereof is a differential piston 8 having a stem 9 at the end adjacent the pump housing 3 and having a stem 10 at its opposite end. The valve housing 2 has an internal bore 11 coaxial with, and connected at its inner end to the adjacent end of, the cylinder 4. At the opposite end of the bore 11 and in communication therewith is a valving cavity 12 in which valve means, later to be described, are provided for controlling reciprocation of the piston 8 and the regenerative circuitry. At the opposite end of the cylinder 4 from the valve housing 2, the body is provided with a bore 14, coaxial with the cylinder 4, in which the stem 9 is received with radial clearance.

The stem 10 fits the bore 11 with normal operating clearance sufficient to guide the piston 8 in an axial path. The stem 10 is provided with a circumferential groove 15 in which an O-ring 16 is disposed for effecting a seal to prevent the escape of pressure fluid from the cylinder 4 into the cavity 12.

The valve housing 2 of the body has an inlet 18 which is shown, diagrammatically, as connected to the output side of a variable delivery pump 19 and has an outlet 20 which is shown diagrammatically as connected to a suitable sump 21.

In the form illustrated, the converter is shown as one for converting the power introduced by the pressure fluid through the inlet 18 to a higher delivery pressure by means of a pumping assemblage driven by the differential piston 8. This embodiment includes a pumping piston 22 formed integral with the outer end of the stem 9, in effect, a continuation thereof.

For this purpose, the pump housing 3 has a cavity 23 in which is disposed a pump cylinder 24 which has a bore 25 generally coaxial with the cylinder 4 and with the bore 11. For effecting a proper seal for pumping and for constraining the fluid from escaping past the piston 22 from the adjacent end of the cylinder 4, the pump cylinder 24 is made as a separate part of hard metal and the coacting circumferential surfaces of the cylinder 24 and the piston 22, which is also of hard metal, are polished and ground, honed or lapped to a precise fit.

For eliminating possible binding or increased frictional resistance due to expansion and contraction of the metal, the piston 22 is preferably made of the same metal as the cylinder 24.

In order to assure proper alignment at all times of the piston 22 and cylinder 24, the cylinder 24 is mounted for slight radial floating movement in the cavity 23. To this end, the cavity has an internal shoulder 28 against which the inner end of the cylinder 24 is held seated by means of a spring 29. A suitable O-ring 30 is interposed between the shoulder 28 and the inner end of the cylinder 24 for assuring proper seating in all positions to which the cylinder 24 might migrate or tilt. This eliminates the necessity for precision in making the bore of the cylinder 24, the bore of the cylinder 4, and the stem 9 precisely coaxial, thus reducing manufacturing costs.

The cylinder 24 discharges at its outer end into the cavity 23 which is closed at its outer end by an end plug 32. The plug 32 has an outlet duct 33 connected at its inner end with the cavity 23 and leading into an internal passage 34 in the plug 32. The passage 34, in turn, leads into an internally threaded delivery passage 35 by which the converter is operatively connected to a device to be operated.

A check valve having a plug 36, biased to seating position by a spring 37, is mounted in the passage 34. The plug seats to close the outlet end of the duct 33. As best illustrated in FIG. 7, the valve plug 36 has transverse passages 38 which, when the plug is unseated, lead to a central passage 39 therein which discharges, in turn, into the outer end of the passage 34 when the plug is unseated. The plug 36 has a piston or guiding portion 40 which fits with operating clearance in the passage 34 and guides the plug 36 to proper seated position.

The inlet 18 of the valve housing 2 is connected by a duct 44 to the cylinder 4 at the left hand side of the piston 8. The duct 44 provides continuous communication between the inlet 18 and the cylinder 4 independently of the operating positions of the valving means. The outlet 20 of the housing 2 is connected by a duct 45 to the cavity 12 continuously.

The stem 10 is provided with a first duct 46 which is continuously connected by a lateral duct 47 with the cylinder 4 at the left or power side of the piston 8. The opposite end of the duct 46 is sealed. The duct 46 has a valving surface, spaced from the piston 8, and an annular port 48 opening through its outer circumferential surface at the valving surface. The stem 10 has a second duct 50 which extends endwise of the stem entirely through the stem and through the piston 8 and opens at its inner end into the cylinder 4 through the face or side of the piston 8 opposite from the stem 10. The duct 50 is sealed at its opposite end. Intermediate its ends the duct 50 has an annular valving port 51 which opens through the valving surface of the stem from the port 48. The valving surface is ground and polished to a precise cylindrical shape and dimension.

Mounted within the cavity 12 in coaxial relation to the stem is a valving sleeve 55 which has a polished valving surface which precisely fits the valving surface of the stem 10. In the position illustrated in FIG. 2, the sleeve 55 closes the port 48 and concurrently permits the flow from the port 51 into the cavity 12, from which it is vented to the atmosphere or sump through the outlet 20. The sleeve 55 has an internal groove 56 which, when the sleeve is moved to the position illustrated in FIG. 3, disconnects the port 51 from the cavity 12 and connects it to the port 48, thus interconnecting the first duct 46 and the second duct 50, and thereby connecting the cylinder 4 at the inlet side of the piston 8 with the cylinder 4 at the outlet side of the piston 8 so that, as the piston 8 is moved to the left on a return stroke from the advanced position illustrated in FIG. 3, the pressure fluid in the cylinder 4 at the power or inlet side of the piston 8 is passed to the cylinder 4 at the opposite side of the piston 8.

The stem 9 is of smaller diameter than the stem 10 and consequently the total area of the piston 8 exposed to the pressure fluid in the cylinder 4 is greater at the face or side of the piston adjacent the stem 9 than at the face or side of the piston 8 adjacent the stem 10.

With pressure fluid being continuously admitted through the inlet 18 and the valve being in the position illustrated in FIG. 3, the pressure fluid at line pressure is applied to both sides of the piston 8 and, due to the larger effective area on the side adjacent the stem 9 relative to that on the side adjacent the stem 10, a positive differential in total pressure is effective on the right hand side of the piston 8 and returns the piston to its starting position.

When the piston 8 is fully returned, and the valve sleeve 55 is moved to its extreme left hand position, as illustrated in FIG. 2, the pressure fluid admitted through the inlet 18 is directed to the left hand side of the piston 8 and the fluid at the right of the piston 8 is vented through the duct 50, port 51, cavity 12, and duct 45 to the outlet 20. Thus the piston can be driven on its power stroke with practically no resistance being imposed by the fluid at the right hand side of the piston, because the cylinder 4 at the right of the piston is vented to the atmosphere. Thus the full line pressure is effective for driving the piston for power conversion.

On its return stroke, there is substantially no resistance or outside load opposing return of the piston and the differential in total pressure drives the piston to the left on the return stroke with little resistance because the pressure fluid at the left of the piston is by-passed from the cylinder 4 at the left side of the piston 8 to the cylinder 4 at the right side of the piston. This provides a regenerative effect and greatly increases the rate of return of the piston 8 and pump piston 22, since the variable delivery pump 19 does not have to pump a volume of pressure fluid equal to the capacity of the cylinder 4 at the right hand side of the piston 8 to effect the full return of the piston 8. Instead, it merely has to retain line pressure. Thus the piston returns almost instantly.

In order to effect the optimum speed of operation of the piston 8, it is necessary that the valve means be operable to connect the outlet ports 48 and 51 in their proper relations with a snap action. This requires that sleeve 55 be moved substantially instantaneously from one operating position to the other on each stroke of the piston 8 and that it be free from frictional drag between the valving surface of the stem 10 and its complementary valving surface.

For this purpose, the sleeve is supported in a novel manner by specialized springs 57. The springs 57 extend radially of the sleeve when it is in its centered position endwise, and are arranged in spaced relation to each other about the circumference of the sleeve. As best illustrated in FIGS. 5 and 6, each spring 57 preferably is a leaf spring having an inner end portion 57a, a bowed intermediate portion 57b which is bowed flatwise of the spring, and an outer end portion 57c. The inner end portion 57a is provided with a straight edge 58 which, in the installed position of the spring, extends chordally of the sleeve and which may be a knife edge. At the lateral midportion of the edge 58, the portion 57a has a radially extending integral tongue 59. The outer end portion 57c of the spring has a curvilinear edge 60 which is convex outwardly. The edges 58 and 60 are for effecting the proper installation of the springs and for reducing friction to a negligible amount.

For this purpose, the sleeve 55 is provided with a plurality of coplanar chordal slots 61 respective to the springs. Each slot 61 has a notch 62 at its midportion. In the installed position of an associated spring the edge 58 engages the bottom wall of the slot 61 and the tongue 59 engages in the notch 62 with clearance so that it constrains the spring from displacement endwise of the slot 61. Due to the line contact between the edge 58 and bottom of the chordal slot 61, friction between the spring and sleeve is substantially eliminated. At the same time, the elongated edge 58 prevents rocking of the spring 57 edgewise, while permitting its inner end portion 57a to rock substantially frictionlessly transversely of the chordal slot 61 or endwise of the sleeve 55.

The valving housing 2 of the body is provided with a circumferential groove 64 which opens inwardly toward the axis of the sleeve 55 and is positioned so that, in the center position of the sleeve 55 endwise of the stem 10, it is coplanar with the chordal slots 61, thus providing an over-center spring connection. The radius of the outer edge 60 of each spring 57 is less than the radius of the groove 64 so that the outer edge 60 engages the bottom of the groove 64 with substantially point contact only, thereby substantially eliminating friction between the springs 57 and housing 2.

With this arrangement, each spring 57 can rock in a direction endwise of the stem 10 from an extreme left position, as in FIG. 2, past an over-center position coplanar with the chordal slot 61 and groove 64, to an extreme right position.

The circumferential spacing of the springs 57 relative to the sleeve is such that the forces of the springs applied inwardly radially of the sleeve are balanced so that they hold the sleeve floatingly in coaxial relation with the stem 10 with the clearance between the inner valving surface of the sleeve and the valving surface of the stem substantially uniform about the circumference of the stem. This distributed clearance is very close, and permits the formation of tenacious capillary oil films between the valving surfaces of the sleeve and the stem 10. As a result the sleeve is supported for movement endwise and is in relatively floating relation to the stem. The sleeve, therefore, can be caused by the springs to respond substantially instantaneously, without any dwell or built-up time, upon movement of the sleeve past the center position which occurs when the chordal slots 61 and the groove 64 are coplanar.

In order to move the valve sleeve 55 endwise in opposite directions from either final operating position past over-center positions of the springs 57, the sleeve is provided with diametrically opposite slots 66 in which a diametral pin 67 on the stem 10 is accommodated for movement endwise with the stem and relative to the sleeve. The slot 66 is of such length relative to the diameter of the pin 67 that it and the pin 67 provide a lost motion connection between the stem 10 and sleeve 55.

In the position shown in FIG. 2, the sleeve is at its extreme left position, and the pin 67 rests in the right hand end of the slot 66. Accordingly, as the stem 10 moves to the right, the sleeve 55 is driven immediately thereby to the right, the springs 57 being compressed and rocking to the right about their outer end edges 60. This continues until the sleeve passes the over-center position, whereupon the springs 57 drive the sleeve 55 to its extreme right hand position with a snap action which is permitted by the lost motion provided by the slot 66 and the pin 67. The sleeve remains in the extreme right hand position with the pin 67 now in the left hand end of the slot 66, or close thereto, so that as the piston 8 returns and the stem 10 moves to the left, the sleeve 55 is moved therewith until it again reaches the over-center position, whereupon it is snapped instantly to its extreme left position by the springs 57.

In the form illustrated, the converter is one which delivers pressure fluid into the passage 35 at higher pressure than that of the line pressure, but necessarily at less volume. On the other hand, the converter can be arranged so that it delivers a lesser pressure than the line pressure, but at a greater volume depending upon the particular requirements of the equipment in connection with which it is used. Further, in this form, the delivered fluid is a portion of the operating fluid supplied by the line.

OPERATION

In operation, line pressure is continually admitted to the inlet 18 and into the cylinder 4 at the left of the differential piston 8 and to the duct 46. In this starting position, as illustrated in FIG. 2, the cylinder 4 at the right hand end of the differential piston is vented through the duct 50 and port 51 into the valving cavity 12 from which it is discharged through the duct 45 and the outlet 20 to the sump. Accordingly, the differential piston 8 is driven to the right, thereby driving the pumping piston 22 to the right, pumping the fluid in the cylinder 24 through the cavity 23 and delivering it to points of application through the passage 35. This pumping action continues until the differential piston 8 is driven sufficiently far to the right to actuate the over-center springs 57 and cause the sleeve 55 to snap to the right relative to the stem 10. When the sleeve 55 is snapped to its extreme right position by the springs, its groove 56 interconnects the ducts 46 and 50 by ways of ports 48 and 51 so that the interior of the cylinder 4 at the right hand end of the differential piston 8 is connected to the cylinder 4 at the left hand end of the piston 8, and also thereby connected with the inlet 18.

Due to the fact that the stem 9 is of less diameter than the stem 10, the effective area of the piston 8, subjected to the fluid pressure at the right hand face of the piston 8, is greater than the area of the piston 8 subject to the fluid pressure at the left hand face of the piston 8, as a result of which the total pressure urging the piston to the left is greater than that resisting it on the right so that the piston is returned to the position illustrated in FIG. 2, from its extended position illustrated in FIG. 3. Concurrently, the pressure fluid formerly entrapped between the end of the cylinder 4 and the left hand face of the piston 8 is not vented to exhaust but passed through the piston 8 by way of the ducts 46 and 50 to the right hand side of the piston, thus providing a regenerative effect and eliminating the necessity for a delivery by the variable delivery pump of a volume of fluid sufficient to fill the cylinder 4 at the right of the piston 8 as the piston moves to the left. The pump need only maintain pressure with a very slight delivery to replace leakage losses.

On the other hand, during the power or pumping stroke of the piston 8, the variable delivery pump must deliver fluid in sufficient volume to fill the cylinder at the left of the piston 8. Since the port of the cylinder 4 at the right of the piston is connected to the sump, substantially no resistance due to the supplied fluid pressure is exerted on the piston 8 on its power stroke and all of the pressure from the variable delivery pump is utilized effectively.

The regenerative effect also has a distinct advantage in that it relieves the piston 8 on its return stroke, from hydrostatic imbalance, the unit pressure on opposite faces of the piston being substantially the same. This permits the sealing between the piston 8 and the cylinders by a simple O-ring 70, operating in a groove 71, which, since it is not under a large imbalance of fluid pressure, can provide an effective seal without any appreciable frictional resistance to movement of the piston, tight fitting, and distortion. However, the pumping piston 22 of the stem 9 develops at its discharge side, a very high pressure which necessarily is imbalanced because the cylinder 4 at the right hand end of the piston 8 is vented to sump during the power stroke. Accordingly, an extremely tight seal must be provided without the use of packing.

For this purpose, the pumping piston 22 of the stem 9 and the cylinder 24 are made of hard metal, and the complementary surfaces are precisely ground and polished and lapped to a high precision fit.

Since the form of the invention thus far described is to deliver part of the same fluid which is admitted for operation of the piston 8, the duct 46 is extended through the piston 8 and through the stem 9 and opens into the central cavity or bore 73 in the pumping piston 22. The outlet of the duct 46 into the bore 73 is normally closed by a check valve 74, similar to the check valve 36, seated by a spring 75.

When the valve 74 is seated, it prevents return of fluid from the cavity 23 and the bore 73 through the duct 46, but when opened it permits passage of fluid from the cylinder 4 through the duct 46 to the cavity 23. On the power stroke, the pressure fluid in the cavity 23 seats the valve 74. The valve 74 is similar in all respects to the valve 36 hereinbefore described.

Here it is to be noted that the valve 36 is carried in a suitable sleeve 76 having an enlarged annular flange 77 at its inner end and mounted in the cavity 23. As mentioned hereinbefore, the cylinder 24 is also in the form of a sleeve which is mounted in the cavity 23 and held therein for limited radial movement by the spring 29. The opposite end of the spring 29 bears on the inner face of the flange 77 thus holding the sleeve 76 in properly assembled position. An O-ring seal 78 is provided, in a groove 79, between the flange 77 and the interior wall of the cavity 23.

As an example of one use of the converter described, it is shown in FIG. 8 as operating a plurality of circumferentially arranged clamping jaws J of a chuck, which jaws are actuated by conventional reversible piston and cylinder assemblages A. These assemblages are connected through a common stop and reversing valve V to the delivery side or discharge passage 35 of the converter. Thus, with the line pressure lower than required by the assemblage A, the desired pressure in the assemblage A for closing the jaws J can be obtained. For example, line pressure at 1,000 p.s.i. delivered to the converter would be delivered at 3,000 to 5,000 p.s.i to the assemblages A.

In the form heretofore described, fluid delivered by the converter is the same fluid as that supplied to the converter. In the form illustrated in FIG. 9, however, a different pressure fluid is to be delivered by the converter, in which case the valve 74 is omitted and the cavity 23 is connected to a suitable container C of the fluid to be pumped. In such a case the portion of the duct 46 in the piston 8 and stem 9 may be eliminated. However, for convenience in manufacturing, the piston and stems are best made as in FIG. 2, and the outer end of the bore 73 sealed by a suitable plug, not shown. In such case, a check valve 80 is provided, and opens toward the cavity 23 and prevents return of the fluid to be pumped to the container C. The converter is in all respects that described in connection with FIGS. 1 through 7.

Having thus described my invention, I claim:

1. In a hydraulic pressure converter;
   a body having an inlet and an outlet;
   a motor assemblage carried by the body and including a power cylinder and a differential driving piston reciprocable therein;
   a power delivery device;
   means connecting the differential piston to the device for driving the device by the differential piston;
   a first conduit in continuous communication at one end with the inlet and with the power cylinder at the side of the differential piston to which fluid pressure is to be applied for driving the differential piston on its power stroke;
   a second conduit continuously in communication at one end with the power cylinder at the opposite side of the differential piston;
   each of said conduits having a valving port spaced from its said one end;
   a valve operative in a first operating position in which it blocks the valving port of the first conduit and concurrently connects the valving port of the second conduit with the outlet and operative in a second operating position in which it effects communication of said ports with each other and concurrently stops communication of the second port with the outlet;
   lost motion connecting means connecting the valve to the differential piston so as to effect actuation of the valve toward said first operating position past a predetermined center position as the differential piston is moved a predetermined distance on its power stroke and to effect actuation of the valve toward said second operating position past said center position as the differential piston is moved a predetermined distance on its return stroke; and
   over-center spring means connected to the valve and operative when the valve is actuated past said center position in directions toward said first and second operating positions, respectively, to drive the valve with a snap action to the one of the said first and second operating positions toward which the valve was being actuated as it passed said center position.

2. The structure according to claim 1 wherein the device is a pumping piston and cylinder assemblage including a pumping cylinder and a pumping piston reciprocable therein; and
   means drivingly connect the differential piston to the pumping device.

3. The structure according to claim 1 wherein;
   said valve including an inner valve member connected to the differential piston for movement endwise thereby in fixed relation thereto, and having an external valving surface;
   said ports are in said surface;

a sleeve valve member is mounted on said inner member for reciprocation relative thereto endwise thereof and for movement therewith endwise thereof, and is in valving relation to said ports so as to place the valve in said operating positions upon movement of the sleeve member relative to the inner member in opposite directions, respectively, past an intermediate position on said inner member to two operating positions at opposite sides of said intermediate position; and the over-center spring means are connected to the sleeve member and to the body.

4. The structure according to claim 3 wherein said over-center spring means comprise a plurality of individual over-center springs connected to the body and to the sleeve member at points spaced from each other about the periphery of the sleeve member and exerting balanced forces on the sleeve member which bias the sleeve member to coaxial relation with the inner member and support the sleeve member for free floating movement endwise relative to the inner member.

5. The structure according to claim 3 wherein the over-center spring means comprise a plurality of compression springs extending lengthwise generally radially from the sleeve member and in spaced relation to each other circumferentially of the sleeve member;

said sleeve member has slots respective to the springs and arranged chordally of the axis of the sleeve member;

spring support means are mounted in fixed position relative to the body and have curvilinear groove means extending circumferentially of the axis of the sleeve member and spaced radially from, and concave and opening toward, the sleeve member, and positioned endwise of the path of the sleeve member so that, in said center position of the sleeve member, the slots are aligned radially of the sleeve member with said groove means;

each spring has a linear bearing surface at its inner end bearing against, and extending endwise of, the bottom of an associated one of the chordal slots, and has at its outer end a curvilinear outwardly convex bearing surface bearing against the bottom of its associated curvilinear groove; and the radius of curvature of each curvilinear bearing surface of each spring being less than the radius of curvature of the bottom of its associated curvilinear groove against which it bears.

6. The structure according to claim 5 wherein means are carried by each spring at its inner end and are connected to the sleeve to constrain the inner end of the associated spring to centered position in its associated chordal slot.

7. The structure according to claim 1 wherein:

the power cylinder has a main bore in the body;

the body has two supplemental bores coaxial with, and at opposite ends, respectively, of, the main bore and arranged with their ends adjacent the main bore connected thereto;

each of the two bores has a diameter different from the other; and the differential piston has stems at its opposite ends fitting into said bores, respectively, whereby the piston has a differential in surface areas exposed in the main bore at opposite ends of the differential piston and related to the difference in the diameters of said stems.

8. The structure according to claim 7 wherein the power piston has a circumferential groove in its circumferential wall, and an O-ring is carried in said circumferential groove and fits the groove and main bore walls so as to provide a sliding seal joint therebetween.

9. The structure according to claim 7 wherein a pumping bore is provided in the body in coaxial relation to, and connected at one end with, one of the supplemental bores;

a pumping piston is provided on the end of the one of the stems which is reciprocable in said one of the supplemental bores; and said pumping piston has a polished and lapped fit with the wall of said pumping bore.

10. The structure according to claim 7 wherein said second conduit is a duct connected at one end to the valve and extending therefrom endwise through said one of the stems, and entirely through the differential piston.

11. The structure according to claim 10 wherein the first conduit is an additional duct connected at one end to the valve and extending therefrom through said one of the stems, entirely through the differential piston, through the other of the stems, and through the pumping piston so as to discharge into said pumping bore; and normally closed check valve means are arranged in said additional duct between its inlet and its outlet into the pumping bore and are openable in a direction of flow of fluid therein toward the pumping bore.

* * * * *